US006652790B2

(12) United States Patent
Niimi et al.

(10) Patent No.: US 6,652,790 B2
(45) Date of Patent: Nov. 25, 2003

(54) METHOD OF FABRICATING BRUSHES

(75) Inventors: Masami Niimi, Handa (JP); Hideki Ichikawa, Maryville, TN (US); Masahiro Katoh, Chiryu (JP)

(73) Assignee: Denso Corporation, Kariya (JP)

( * ) Notice: Subject to any disclaimer, the term of this patent is extended or adjusted under 35 U.S.C. 154(b) by 183 days.

(21) Appl. No.: 09/918,826

(22) Filed: Aug. 1, 2001

(65) Prior Publication Data

US 2002/0014719 A1 Feb. 7, 2002

(30) Foreign Application Priority Data

Aug. 2, 2000 (JP) ....................................... 2000-234087

(51) Int. Cl.[7] ........................... B29B 11/12; B29B 11/14

(52) U.S. Cl. ....................... 264/113; 264/120; 264/122; 264/250; 264/255; 264/259; 264/294

(58) Field of Search ................................ 264/109–128, 264/250, 255, 259, 294

(56) References Cited

U.S. PATENT DOCUMENTS 5,701,046 A * 12/1997 Kammerer et al. ......... 310/251
5,712,522 A 1/1998 Niimi
6,528,923 B2 * 3/2003 Katoh et al. ................ 310/251

* cited by examiner

*Primary Examiner*—Stephen J. Lechert, Jr.
(74) *Attorney, Agent, or Firm*—Oliff & Berridge, PLC

(57) ABSTRACT

In a two-layer brush for a commutator, the plane form projected on a commutator surface is nearly similar to the plane form of the segment. A molding die used in brush fabrication has a lower punch which slides obliquely up and down along a sliding groove provided in the lower die, and an upper punch which can slide obliquely up and down in relation to the lower punch. The pressure applying face of the upper punch is formed nearly level, while the pressure receiving face of the lower punch is inclined by a predetermined angle relative to the pressure applying face of the upper punch. It is, therefore, possible to form a first brush material to a predetermined shape, and to apply a uniformly pressure to the second brush powder, to thereby form a second brush material having nearly fixed thickness.

2 Claims, 6 Drawing Sheets

METHOD OF FABRICATING BRUSHES

CROSS-REFERENCE TO RELATED APPLICATION

The present invention is related to Japanese patent application No. 2000-234087, filed Aug. 2, 2000; the contents of which are incorporated herein by reference.

FIELD OF THE INVENTION

The present invention relates to a method of fabricating brushes, and more particularly to a method of manufacturing brushes which slide in contact with the surface of a commutator of an armature.

RELATED ART

There has been a known method of adopting a brush of double-layer construction as a means to improve commutator characteristics and accordingly to prolong brush life. The double-layer brush is a laminate formed for example of a first brush material (low carbon) of high resistivity and a second brush material (high carbon) of low resistivity. Good brush characteristics are obtainable by arranging particularly the second brush material orthogonally to the direction of rotation of the commutator and also by using a thin material of uniform thickness.

When the double-layer brush is used in an armature (shown in FIG. 7) having a surface-type commutator (the commutator surface is orthogonal to the axis of rotation), the shape of the end face of the brush in sliding contact with the commutator surface is preferably shaped as each segment constituting the commutator. For example, as shown in FIG. 5, when each segment is inclined to the direction of rotation (not along the radial direction), the end face of the brush becomes irregular, approximately trapezoidal in shape (a shape projected on the commutator surface) which is inclined in relation to the direction of rotation, correspondingly to the shape of the segment.

To mold the uniform, thin second brush material in fabricating the double-layer brush of irregular shape, it is necessary to press and mold the brush powder of the second brush material in a level state. In the conventional practice, as shown in FIG. 8, a molding die equipped with a lower punch 200 and an upper punch 210, which slides up and down, is used to mold the second brush material in a level position, thereby pre-molding a rectangular brush block 100A. After molding, an unnecessary portion is removed by cutting or other means, to make a double-layer brush having an irregular shape.

The conventional method of fabrication shown in FIG. 8, however, presents such a problem that, because removal of the unnecessary portion from the brush block 100A is needed, material yields become very low, resulting in a high unit price of products. Furthermore, a process is needed to remove the unnecessary portion from the brush block 100A. Therefore, not only does the number of fabricating processes increase, but an enormous facility cost is required. Furthermore, a tool mark remains on the sliding surface of the brush when the unnecessary portion is removed, resulting in deteriorated sliding performance of the brush.

SUMMARY OF THE INVENTION

In view of the above-described circumstances, it is an object of the invention to provide a method of fabricating brushes to be used in an armature having a surface-type commutator. More specifically, it is an object of the invention to provide a method for easily fabricating brushes of multi-layer construction for use correspondingly to the shape of segments constituting the commutator.

In a first aspect, brushes are configured with the projected form of their plane on the surface of the commutator conforming to the shape of the segments, and are each formed by laminating a first brush material produced from a first brush powder on a second brush material produced from a second brush powder. The first brush material is placed on the front side in the direction of rotation of the armature, and the second brush material on the rear side. The second brush material is set at nearly fixed values in thickness. The front end face of the first brush material is inclined to a predetermined angle in relation to the rear end face of the second brush material. The brushes are fabricated through the following molding process.

The molding process includes the first molding process in which the first brush powder is charged onto the pressure receiving face of the lower punch and then the upper punch is fed down to press to form the first brush material, and the second molding process in which, after the upper punch is raised, the second brush powder is charged onto the first brush material thus molded and the upper punch is fed down again to press to form the second brush material.

In the molding die used in the brush fabricating process, the pressure applying face of the upper punch is formed nearly level, and the pressure receiving face of the lower punch is inclined at a predetermined angle in relation to the pressure applying face of the upper punch (the angle of inclination of the front end face of the first brush material in relation to the rear end face of the second brush material). Therefore, in the first molding process, the first brush material can be molded into a predetermined shape, and the upper surface of the first brush material which serves as an interfacial boundary with respect to the second brush material can be molded nearly level. In the second molding process, therefore, since the second brush powder can be charged onto the nearly level surface (the upper surface of the first brush material), it is possible to uniformly press the second brush powder to produce the second brush material of nearly uniform, fixed thickness.

In another aspect, the plane form to be projected on the commutator surface of the brush corresponds to the shape of the segment. Therefore, the brush is made of the first brush material molded of the first brush powder laid on the second brush material molded of the second brush powder. The first brush material is arranged on the front side in the direction of rotation of the armature, and the second brush material on the rear side. The second brush material has nearly fixed thickness, and the front end face of the first brush material is inclined to a predetermined angle in relation to the rear end face of the second brush material.

The brush is fabricated through the following molding process. The molding process includes the first molding process in which the second brush powder is charged onto the pressure receiving face of the lower punch, the first upper punch is fed down to press to mold the second brush material, and the second molding process in which, after the first punch is elevated, the first brush powder is charged onto the second brush material thus molded, then the second upper punch is fed down to press to mold the first brush material.

In the molding die used in the brush fabricating process, the pressure receiving face of the lower punch and the pressure applying face of the upper punch are each formed nearly level. Therefore, in the first molding process the second brush powder can be charged onto the nearly level surface (the pressure receiving face of the lower punch). Therefore, it is possible to apply a uniform pressure to the second brush powder with the first upper punch, to thereby uniformly form the second brush material having approximately fixed thickness.

Furthermore, since the pressure applying face of the second upper punch is inclined to a predetermined angle to the pressure receiving face of the lower punch (the angle of inclination of the front end face of the first brush material in relation to the rear end face of the second brush material), the first brush material can be molded to a predetermined shape in the second molding process.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DESCRIPTION OF THE PREFERRED EMBODIMENTS

Next, a method of fabricating brushes will be explained with reference to the accompanying drawings.

Figure 6:
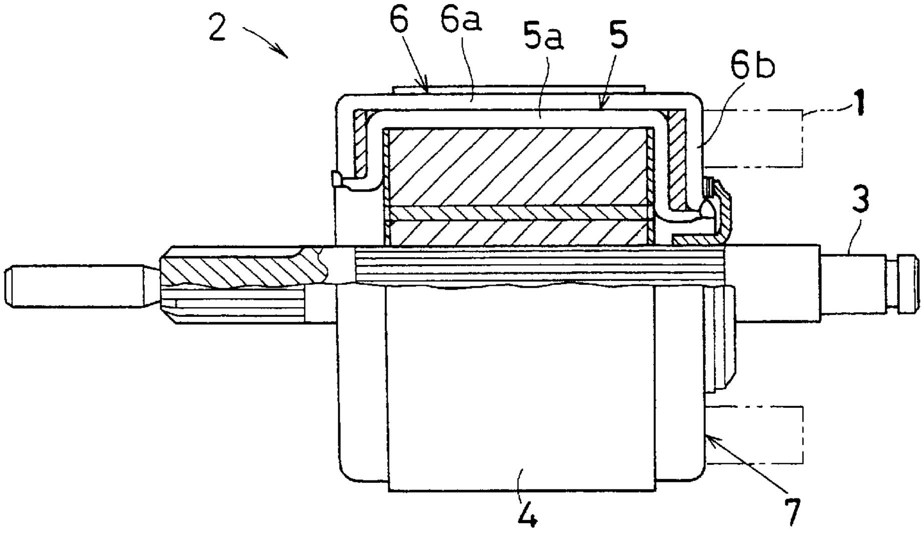
FIG. 6 is a partial cross-sectional view of an armature.
Figure 7:
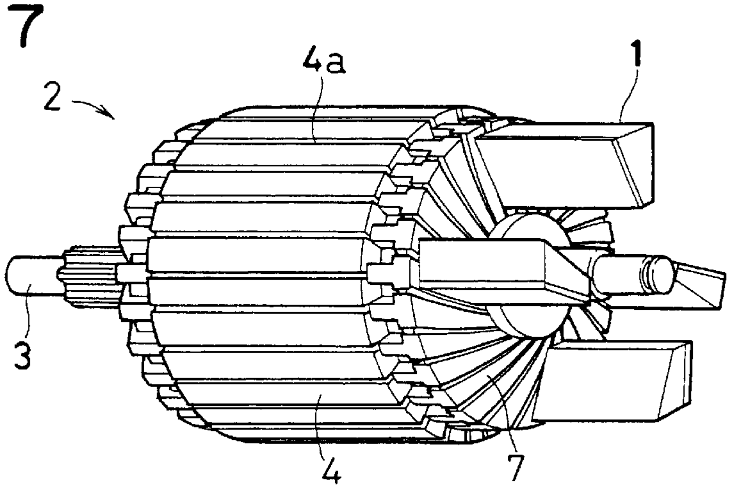
FIG. 7 is a perspective view of the armature.

FIG. 6 is a semi-sectional view of an armature 2, and FIG. 7 is a perspective view of the armature 2. A brush 1 of the present embodiment is used in the armature 2 which is provided with a surface-type commutator. First, the configuration of the armature 2 will be briefly explained. The armature 2 is used in, for example, a stator motor for automobiles, and comprises shaft 3, core 4, and armature coil as shown in FIG. 6. The armature coil is formed by attaching a plurality of pre-divided lower-layer conductive pieces 5 and a plurality of pre-divided upper-layer conductive pieces 6 to the core 4.

Figure 5:
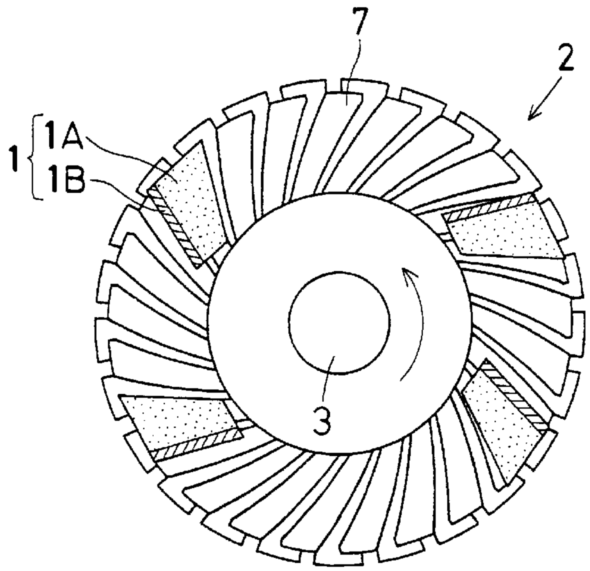
FIG. 5 is a schematic view of a commutator surface as viewed in the axial direction.

The lower-layer conductive pieces 5 and the upper-layer conductive pieces 6 are arranged each in an approximately U-form. After insertion of straight portions 5*a* of the lower-layer conductive pieces 5, one by one, into a slot 4*a* (shown in FIG. 7) provided in the core 4, straight portions 6*a* of the upper-layer conductive pieces 6 are inserted one by one into the upper layer of the lower-layer conductive pieces 5. Then, the end portions of the lower-layer conductive pieces 5 and the upper-layer conductive pieces 6 are connected on both sides in the axial direction of the core 4 to thereby form the armature coil (shown in FIG. 6). The straight portion 6*a* of each upper-layer conductive piece 6 is bent to form arm portions 6*b*, one of which is used as a segment constituting the commutator. The end face of each arm portion 6*b* in the axial direction forms a commutator surface 7 orthogonal to the shaft 3. One of the arm portions 6 (the plane form of the segment) as viewed in the axial direction, in FIG. 5, is inclined in relation to the direction of rotation of the armature 2, and the width in the circumferential direction gradually increases from the inner diameter side toward the outer diameter side.

Next, the configuration of the brush 1 will be explained. The brush 1 contacts the commutator surface 7 in the axial direction, being pressed against the commutator surface 7 by an unillustrated brush spring as shown in FIG. 7.

The brush 1 is formed by laminating a first brush material 1A and a second brush material 1B which differ in resistivity. The first brush material 1A is arranged on the front side and the second brush material 1B is arranged on the rear side in relation to the direction of rotation of the armature 2 as shown in FIG. 5. The first brush material 1A is made of the first brush powder having a high percentage of carbon content, while the second brush material 1B is made of the second brush powder having a low percentage of carbon content.

Furthermore, the plane form of the brush 1 projected in the axial direction onto the commutator surface 7 is approximately similar to that of the segment. That is, it is formed as an irregular quadrilateral form inclined with respect to the direction of rotation of the armature 2. The second brush material 1B, however, is nearly fixed in thickness in the direction of lamination (circumferential direction), and is thinner than the first brush material 1A. On the other hand, the first brush material 1A gradually increases in thickness in the direction of lamination (circumferential direction) from the inner diameter side toward the outer diameter side, and the front end face of the first brush material 1A is inclined to a predetermined angle in relation to the rear end face of the second brush material 1B.

Subsequently, the method of fabricating the brush 1 will be explained. First, the molding die used in fabricating the brush 1 will be explained. The molding die, as shown in FIG. 1, has a lower die 8 having a slide groove 8*a* formed in an obliquely up-and-down direction, a lower punch 9 which can slide in an obliquely up-and-down direction along the sliding groove 8$a$, an upper punch 10 which can slide in an obliquely up-and-down direction in relation to the lower punch 9, and an upper die 11 slidably holding the upper punch 10. The pressure applying face 10$a$ of the upper punch 10 is formed nearly level, while pressure receiving face 9$a$ of the lower punch 9 is inclined by a predetermined angle to the pressure applying face 10$a$ of the upper punch 10 (the angle of inclination of the front end face of the first brush material 1A in relation to the rear end face of the second brush material 1B).

Figures 1A, 1B, 1C:
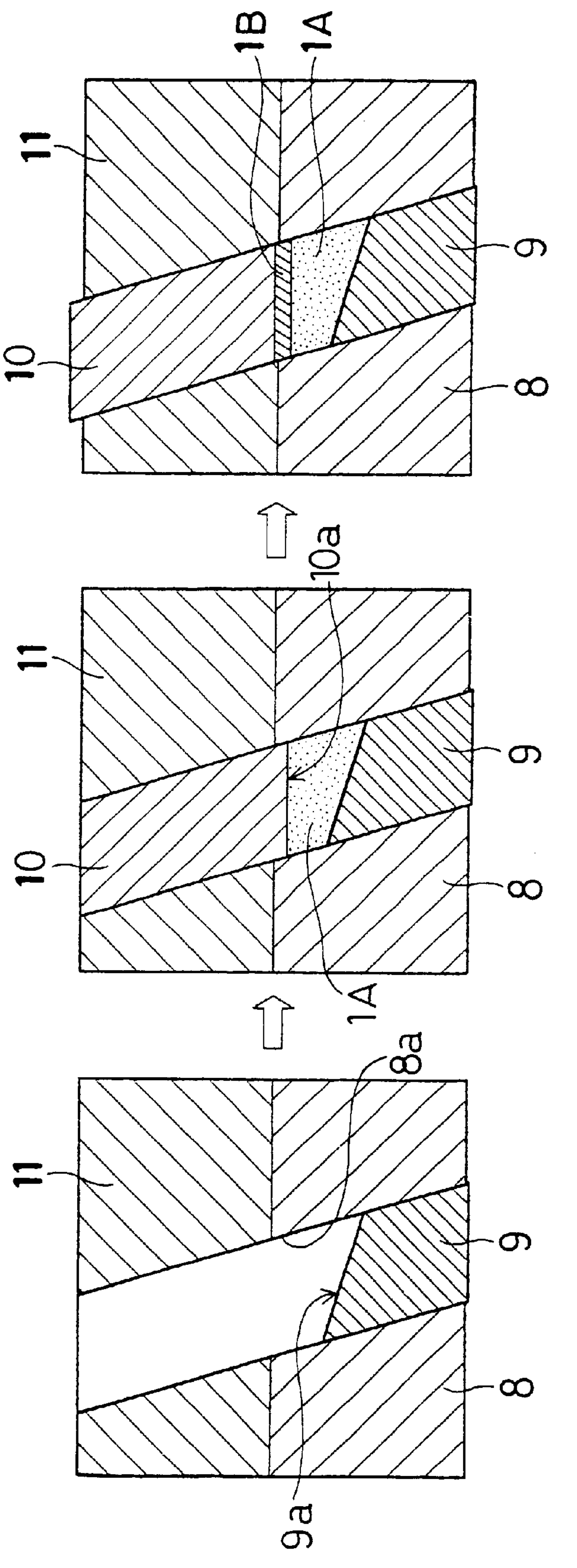
FIG. 1A is a first step in a process chart showing a two-layer brush molding process (first embodiment)
FIG. 1B is a second step in a process chart showing a two-layer brush molding process (first embodiment)
FIG. 1C is a third step in a process chart showing a two-layer brush molding process (first embodiment)
Figure 2C:
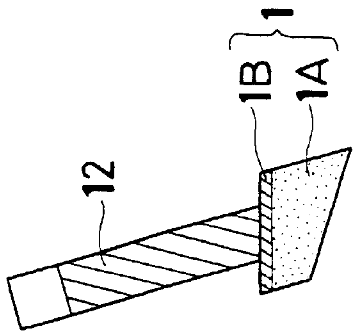
FIG. 2C is a sixth step in a process chart showing a two-layer brush molding process (first embodiment)
Figure 2B:
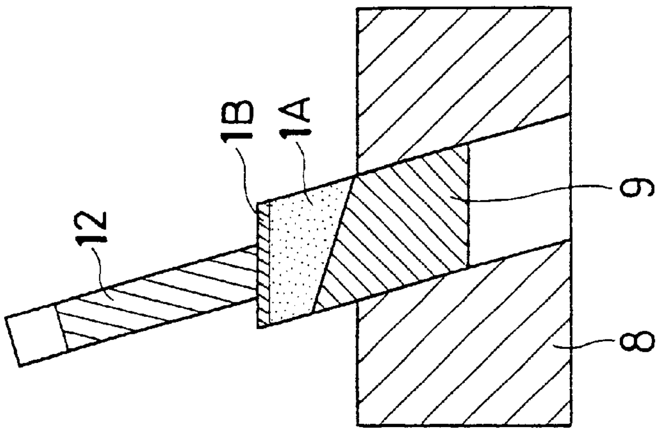
FIG. 2B is a fifth step in a process chart showing a two-layer brush molding process (first embodiment)
Figure 2A:
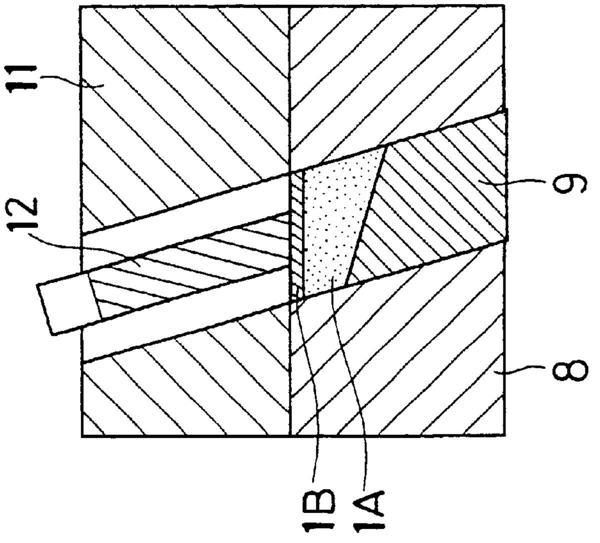
FIG. 2A is a fourth step in a process chart showing a two-layer brush molding process (first embodiment)

(Operation)

a) With the lower punch 9 held in a predetermined wait position of the lower die 8, the first brush powder is charged onto the pressure receiving face 9$a$ of the lower punch 9.

b) In the first molding process, the upper punch 10 is fed down to press the first brush powder to form the first brush material 1A (shown in FIG. 1B).

c) After the upper punch 10 is raised, the second brush powder is charged onto the top of the first brush material 1A thus formed.

d) In the second molding process, the upper punch 10 is fed down to press the second brush powder to form the second brush material 1B (shown in FIG. 1C).

e) After the upper punch 10 is raised, a pigtail 12 is embedded in from the second brush material 1B side (shown in FIG. 2A).

f) The lower punch 9 is slid obliquely upward to eject the brush 1 thus molded (shown in FIG. 2B).

g) Thus obtained is a finished double-layer brush 1 free of an unnecessary molded portion (shown in FIG. 2C).

In the present embodiment, it is possible to uniformly form the second brush material 1B of nearly fixed thickness. That is, in the molding die used in the brush 1 fabricating process, the pressure applying face 10$a$ of the upper punch 10 is formed nearly level, while the pressure receiving face 9$a$ of the lower punch 9 is inclined by a predetermined angle in relation to the pressure applying face 10$a$ of the upper punch 10. In the first molding process, therefore, the first brush material 1A can be molded to a predetermined shape, and the upper end face of the first brush material 1A which serves as an interfacial boundary relative to the second brush material 1B can be formed nearly level. In the second molding process, therefore, the second brush powder can be charged nearly level (the upper end face of the first brush material 1A), and therefore it is possible to apply a uniform pressure to the second brush powder, to thereby uniformly form the second brush material 1B having nearly fixed thickness.

Figure 8:
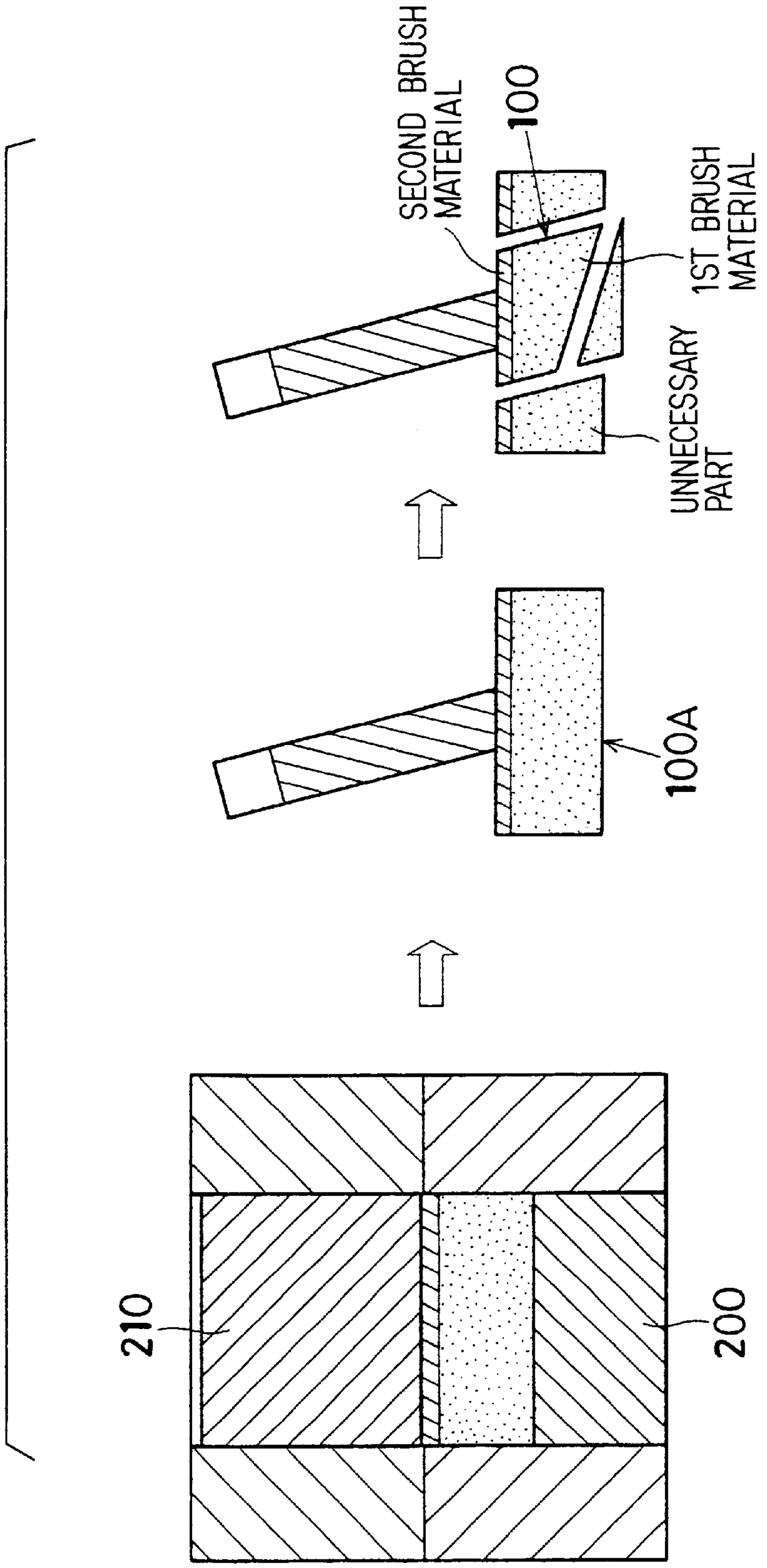
FIG. 8 PRIOR ART
FIG. 8 is a process chart showing the two-layer brush molding process according to the prior art.

According to the fabricating method, no unnecessary portion will be formed in the molding process, thereby improving material yields. Furthermore, the process for removing unnecessary portions from a brush molding which is needed in the conventional fabrication method (shown in FIG. 8) can be done away with. Consequently, it is possible to decrease the number of fabrication processes, to substantially decrease facility costs, and accordingly to hold a unit price of products as low as possible. Furthermore, because of the abolishment of the unnecessary portion removing process, a tool mark likely to occur during the removing process will not remain in the sliding surface of the brush 1. It is, therefore, possible to prevent the brush 1 from deterioration from sliding.

(Second Embodiment)

Figures 3A, 3B, 3C:
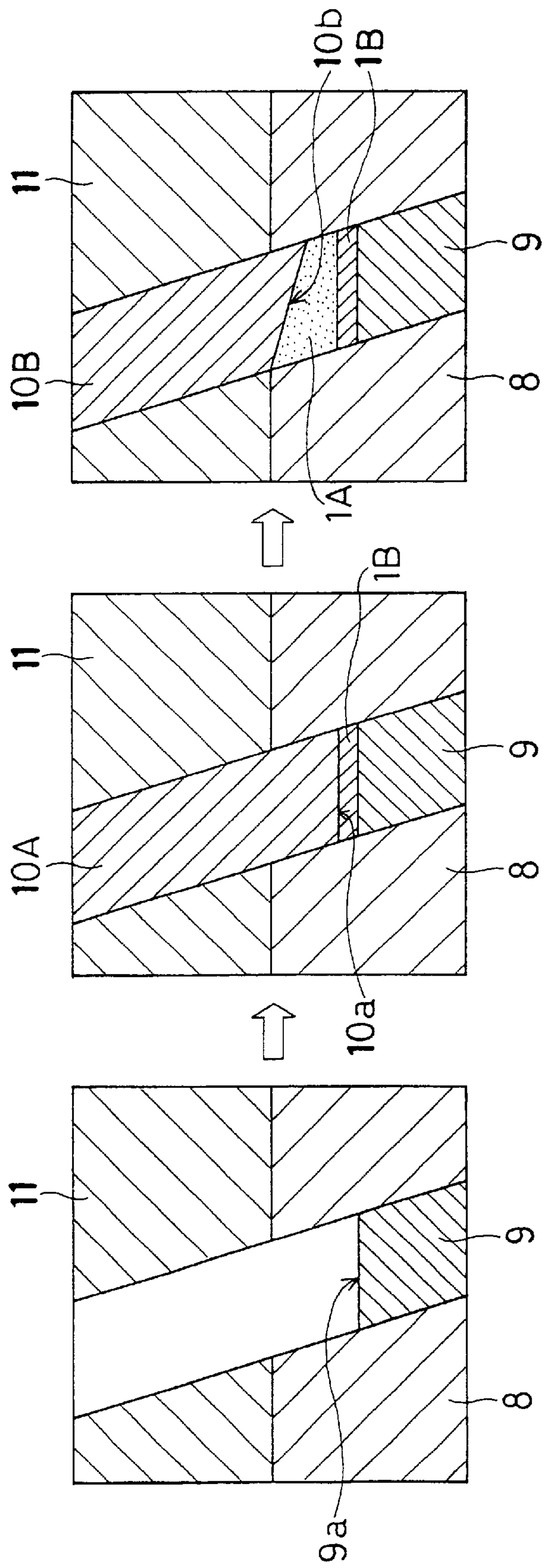
FIG. 3A is a first step in a process chart showing the two-layer brush molding process (second embodiment)
FIG. 3B is a second step in a process chart showing the two-layer brush molding process (second embodiment)
FIG. 3C is a third step in a process chart showing the two-layer brush molding process (second embodiment)
Figure 4A:
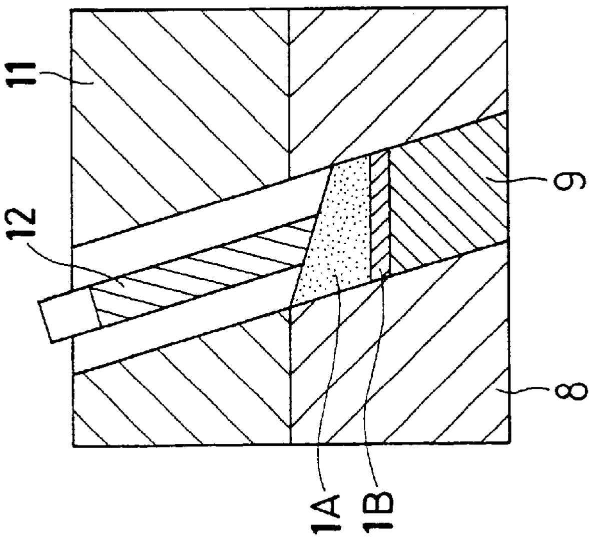
FIG. 4A is a fourth step in a process chart showing the two-layer brush molding process (second embodiment)
Figure 4B:
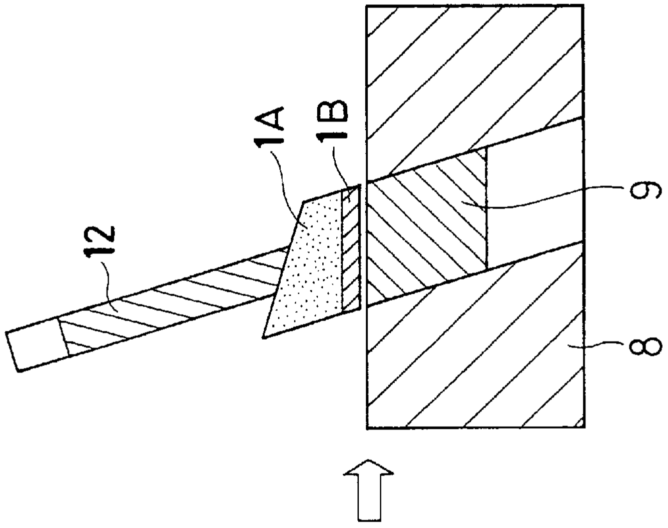
FIG. 4B is a fifth step in a process chart showing the two-layer brush molding process (second embodiment)
Figure 4C:
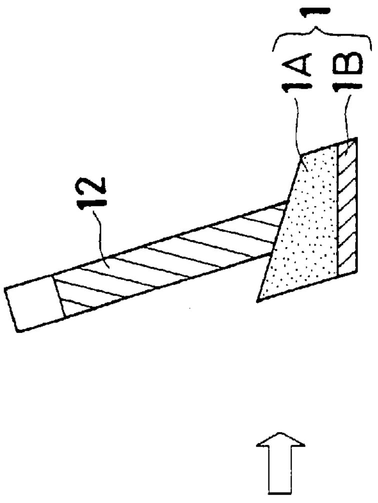
FIG. 4C is a sixth step in a process chart showing the two-layer brush molding process (second embodiment)

First, a molding die used in fabricating the brush 1 will be explained. The molding die has, as shown in FIG. 3, the lower die 8 having the sliding groove 8$a$ in the obliquely up-and-down direction, the lower punch 9 which is slidable in the obliquely up-and-down direction along the sliding groove 8$a$, and an upper die 11 which holds, in a slidable state, the first upper punch 10A and the second upper punch 10B which are capable of sliding obliquely up-and-down in relation to the lower punch 9, and the first upper punch 10A or the second upper punch 10B. The pressure receiving face 9$a$ of the lower punch 9 and the pressure applying face 10$a$ of the first upper punch 10A are formed nearly level; and the pressure applying face 10$b$ of the second upper punch 10B is inclined by a predetermined angle relative to the pressure receiving face 9$a$ of the lower punch 9 (the angle of inclination of the front end face of the first brush material 1A relative to the rear end face of the second brush material 1B). The process is as follows.

a) The lower punch 9 is held in the predetermined wait position in the lower die 8, the second brush powder is charged onto the pressure receiving face 9$a$ of the lower punch 9.

b) In the first molding process, the first upper punch 10A is fed down to press the second brush powder to form the second brush material 1B (shown in FIG. 3B).

c) After the first upper punch 10A is raised, the first brush powder is charged onto the second brush material 1B thus formed.

d) Second molding process . . . The second upper punch 10B is fed down to press the first brush powder, thus forming the first brush material IA (shown in FIG. 3C).

e) After the upper punch 10 is raised, the pigtail 12 is embedded from the first brush material 1A side (shown in FIG. 4A).

f) The lower punch 9 is raised obliquely to eject the brush 1 thus formed.

g) Thus a double-layer brush 1 is obtained as a finished product free of unnecessary molded portion (shown in FIG. 4C).

In the present embodiment, it is possible to uniformly form the second brush material 1B having an approximately fixed thickness. That is, in the molding die used in the process for fabricating the brush 1, the pressure receiving face 9$a$ of the lower punch 9 and the pressure applying face 10$a$ of the first upper punch 10A are each formed nearly level. Therefore, in the first molding process, the second brush powder can be charged to a nearly level surface (the pressure receiving face 9$a$ of the lower punch 9) and accordingly it is possible to apply a uniform pressure to the second brush powder by the first upper punch 10A, thereby uniformly forming the second brush material 1B having a nearly fixed thickness.

Furthermore, since the pressure applying face 10$b$ of the second upper punch 10B is inclined by a predetermined angle in relation to the pressure receiving face 9$a$ of the lower punch 9 (the angle of inclination of the front end face of the first brush material 1A relative to the rear end face of the second brush material 1B), the first brush material 1A can be formed to a predetermined shape in the second molding process.

According to this method of fabrication, like in the first embodiment, no unnecessary portion is formed in the molding process, thereby improving the material yields. Furthermore, since there is no need of removing an unnecessary portion after molding, the process for removing an unnecessary portion from a brush molding which is needed in the conventional fabrication method (shown in FIG. 8) can be done away with. Consequently, it is possible to decrease the number of fabrication processes and to substantially reduce the facility cost, thereby enabling to hold the unit price of products as low as possible.

Furthermore, a tool mark likely to occur during the removing process will not remain in the sliding surface of the brush 1, thereby preventing the brush 1 from deterioration due to sliding.

In the first and second embodiments, the method of fabricating the two-layer brush 1 has been described. It should be noticed, however, that the constitution of this invention may be applied to brushes having three or more multi-layers.

While the above-described embodiments refer to examples of usage of the present invention, it is understood that the present invention may be applied to other usage, modifications and variations of the same, and is not limited to the disclosure provided herein.

What is claimed is:

1. A method of fabricating brushes which are used in an armature provided with a commutator and that slide in contact with a plurality of segments of the commutator, a commutator surface having each of the segments being nearly orthogonal to an axis of rotation of the armature, each of the segments being inclined in relation to a direction of rotation of the armature, a plurality of the brushes having a projected form of their plane on the commutator surface that conforms to a shape of the segments, each of the brushes being formed of a first brush material produced of a first brush powder on a second brush material produced of a second brush powder, the first brush powder material being placed on a front side in a direction of rotation of the armature and the second brush material positioned on a rear side, the second brush material being set at nearly fixed values in thickness, the front end face of the first brush material being inclined to a predetermined angle in relation to the rear end face of the second brush material, method comprising:

molding in a first molding process by charging a first brush onto a pressure receiving face of a lower punch;

feeding down an upper punch to press the first brush powder to mold a first brush material; and molding in a second molding process by charging a second brush powder onto a top of the first brush material after the upper punch is elevated, feeding down the upper punch to mold the second brush material;

wherein a molding die is used in the molding processes which has a lower die provided with a slide groove formed in an obliquely up-and-down direction, a lower punch slidably movable in an obliquely up-and-down direction along the slide groove, an upper punch slidably movable in an obliquely up-and-down direction in relation to the lower punch, and an upper die slidably movably holding the upper punch;

wherein the upper punch has a pressure surface provided nearly horizontally, and the lower punch has a pressure receiving face inclined at a predetermined angle in relation to the pressure surface of the upper punch.

2. A method of fabricating brushes which are used in an armature provided with a commutator, and slide in contact with each of a plurality of segments constituting the commutator, a commutator surface having the plurality of segments that is nearly orthogonal to an axis of rotation of the armature, each of the segments being inclined in relation to a direction of rotation of the armature, the brushes having a projected form of their plane on the commutator surface which conforms to a shape of the segments, each of the brushes being formed by laminating a first brush material produced of a first brush powder on a second brush material produced of a second brush powder, the first brush material being placed on a front side in a direction of rotation of the armature, the second brush material is placed on a rear side, the second brush material being set at nearly fixed values in thickness, a front end face of the first brush material being inclined to a predetermined angle in relation to the a end face of the second brush material, the method comprising:

charging a second brush powder onto a pressure receiving face of a lower punch in a first molding process, and feeding an upper punch down to press the second brush powder to mold a second brush material; and charging the first brush powder onto a top of the second brush material and then feeding the upper punch down to mold the first brush material in a second molding process, said second molding process being performed after the upper punch is elevated;

wherein a molding die is used which has a lower die provided with a slide groove formed in an obliquely up-and-down direction, a lower punch slidably movable in an obliquely up-and-down direction along the slide groove, a first upper punch and a second upper punch which are slidably movable in an obliquely up-and-down direction in relation to the lower punch, and an upper die slidably movably holding the first upper punch and the second upper punch;

wherein the pressure receiving face of the lower punch and the pressure surface of the first upper punch being formed nearly horizontally, and the pressure surface of the second upper punch being inclined at a predetermined angle in relation to the pressure receiving face of the lower punch.

* * * * *